Figure 1:
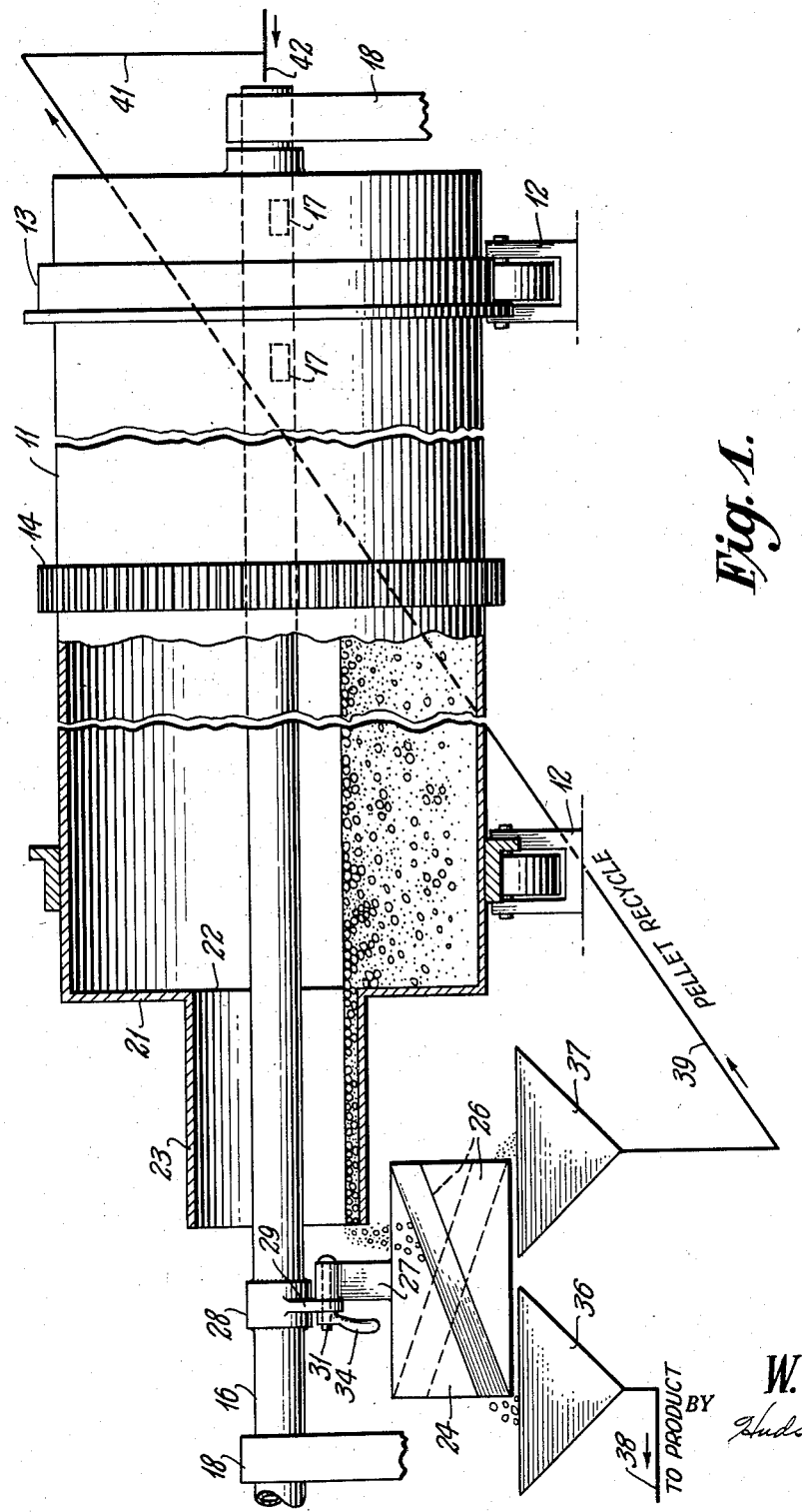

INVENTOR.
W. H. Rushford
BY
ATTORNEYS

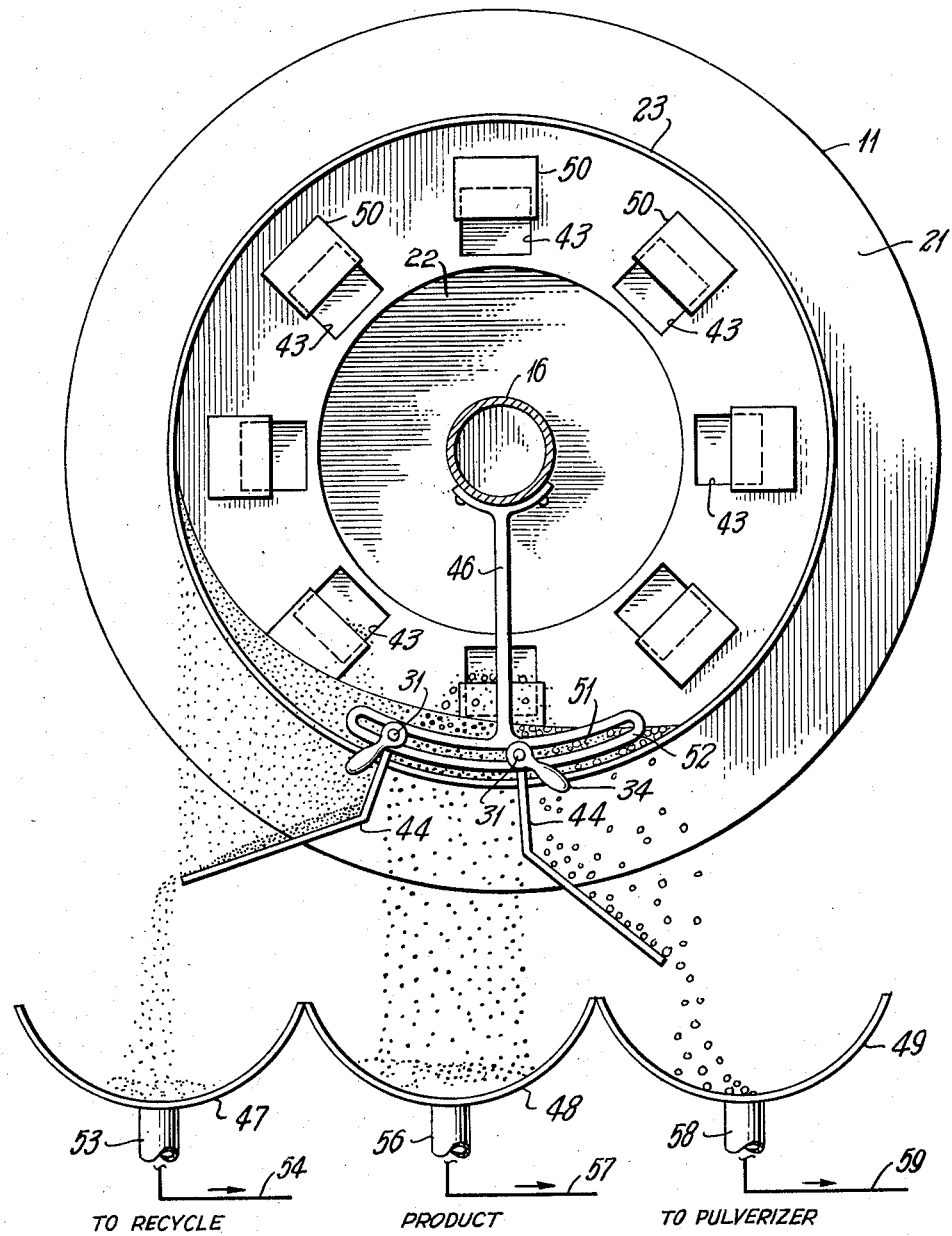

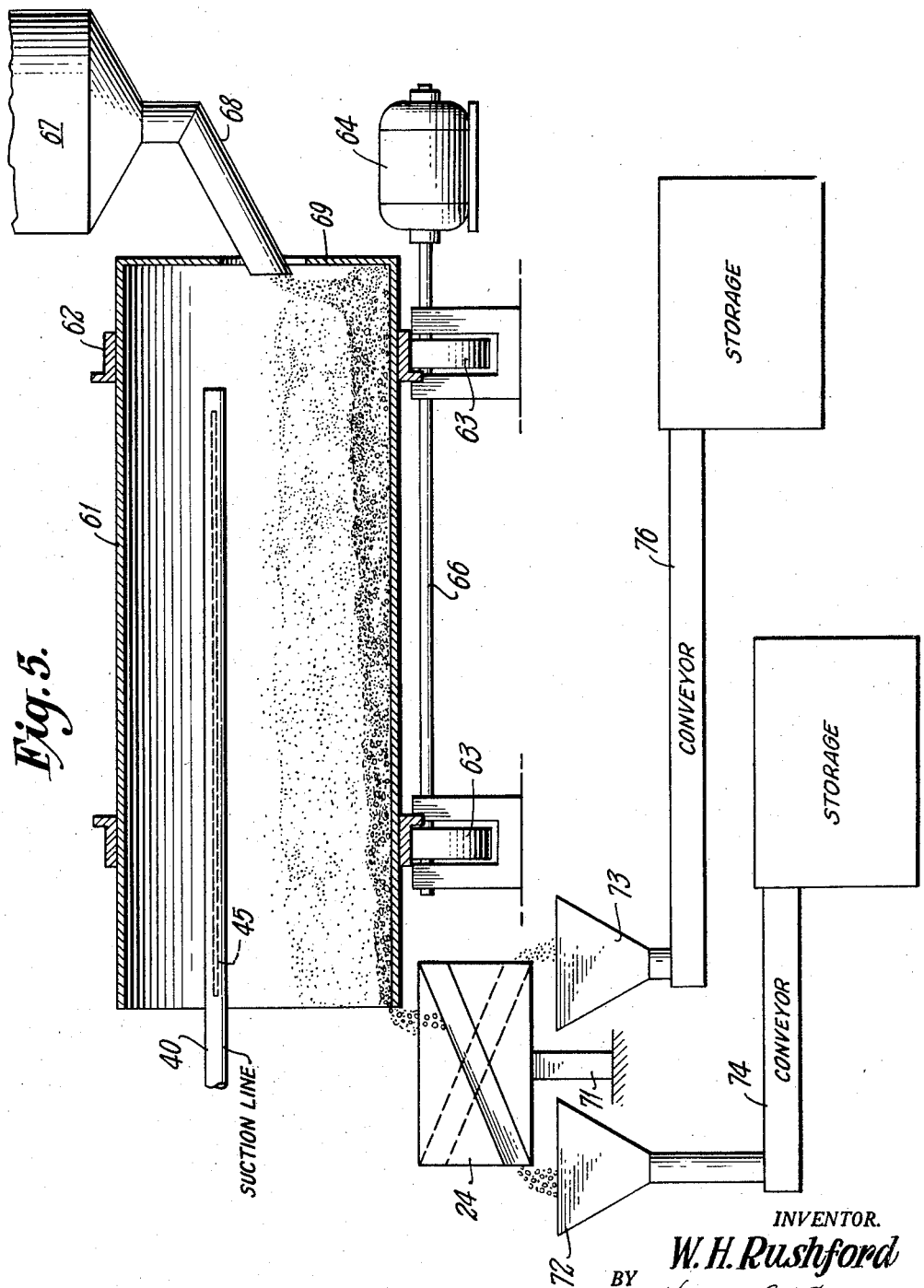

United States Patent Office 2,892,689
Patented June 30, 1959

2,892,689

PROCESS AND APPARATUS FOR CLASSIFYING PARTICULATE MATERIAL

Wilson H. Rushford, Borger, Tex., assignor to Phillips Petroleum Company, a corporation of Delaware Application June 14, 1954, Serial No. 436,670

12 Claims. (Cl. 23—314)

This invention relates to a process and apparatus for classifying particulate solids of generally spherical shape. A specific aspect of the invention is concerned with a process and apparatus for pelleting and classifying carbon black.

The problem of size classification in the manufacture and/or handling of particulate materials is common. Size classification of small particulate solids is usually made by a screening process using vibrating screens. Such processes entail high maintenance cost because of screen plugging, breaking, and failure of the screen and vibrating equipment. The original cost of the screening equipment for continuous screening process is appreciable and contributes to the disadvantages of the screening process. In the carbon black pelleting art loose, flocculent carbon black is generally pelleted in horizontally rotating cylindrical mills by tumbling. Pellets discharged from the pelleting mills are not of uniform size and are generally classified by vibratory or rotary screens which introduce the usual disadvantages of screening and screening equipment to the process and apparatus.

The principal object of the invention is to provide an improved process and apparatus for size classification of particulate fluent solids which avoid the use of screens. Another object of the invention is to provide a process for classifying carbon black pellets in accordance with the size of the pellets. A further object of the invention is to provide an apparatus and process for pelleting carbon black and discharging the pellets in separate streams in accordance with the size of the pellets. It is also an object of the invention to separate a stream of effluent pellets from a carbon black pelleting mill into separate streams of pellets in accordance with their size. Other objects of the invention will become apparent from a consideration of the accompanying disclosure.

I have found that small particulate material having fluent properties, including pelleted carbon black, sand, pelleted metal compounds, such as catalytic metal oxides, and small granular materials having a relatively broad range of sizes are readily separable or classifiable according to size by passing the material to be classified into one end of a horizontally rotating cylinder or drum having an open delivery end, and splitting the stream or current of material emanating from the open end of the drum over the edge or lip thereof in accordance with the size classification desired. Rotation of the drum as the material is fed into the drum and proceeds toward the open end causes the smaller particles of material to rise higher on the ascending side of the drum than the larger particles which remain nearer the bottom of the drum and flow out over the lowermost portion of the lip thereof while the particles of intermediate size are distributed along the lip of the drum intermediate the largest and smallest particles in general accordance with their size. The feed end of the drum need be closed only adjacent the periphery of the drum and radially inwardly a distance at least as great as the depth of the bed of particulate material in the feed end of the drum so as to avoid loss of the particulate material from the feed end of the drum.

Figure 2:
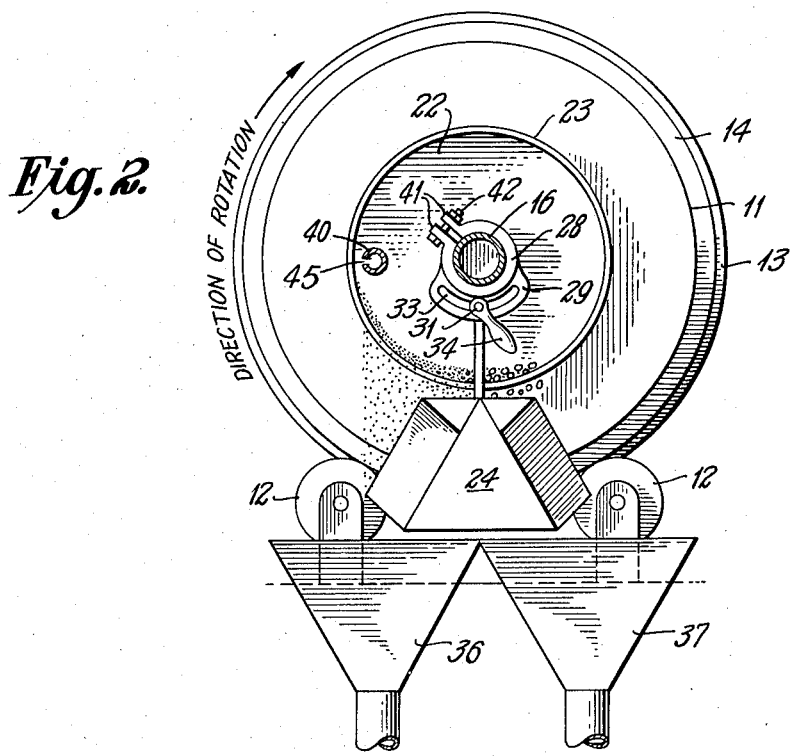
Figure 3:
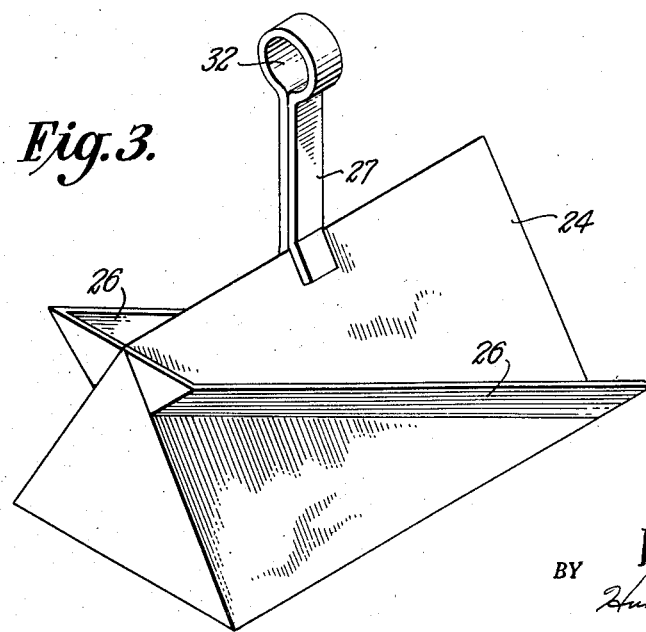

A more complete understanding of the invention may be had by referring to the drawings of which Figure 1 is an elevation partially in section of a conventional pelleting mill for carbon black showing the classifier of the invention attached to the delivery end of the mill; Figure 2 is an end elevation partly in section of a mill similar to that shown in Figure 1 with a different arrangement of the splitter and receiving hoppers; Figure 3 is an isometric view of the splitter of Figure 2; Figure 4 is an end elevation showing another embodiment of a splitter and collector arrangement; and Figure 5 is an elevation partly in section of a preferred embodiment of the classifier of the invention. The views are schematic.

Referring to Figure 1, a cylindrical pellet mill 11 is supported by and rotated on wheel and axial devices 12 arranged to rotate on flanged tracks 13 which hold the mill in position as shown more clearly in Figure 2. A gear wheel or band 14 encircling the mill meshes with a driving gear (not shown) which rotates the mill. A center pipe 16 extends axially through the mill and provides support means for one or more scraper blades (not shown) or device which scrapes the inner surface of the mill above the carbon black bed therein so as to remove scale or solid deposit from the walls of the mill before it builds up to any considerable extent. Center support pipe 16 also houses a feeding device (not shown) which introduces carbon black to the front end of the mill through openings 17 in the support pipe at one or more points. Center pipe 16 is supported by piers 18 at either end.

Delivery end plate 21 has an axial opening 22 which determines the depth of the pellet bed in the mill. An elongated cylindrical drum or shell 23 is welded or otherwise affixed to delivery end plate 21 so as to permit the pellets egressing from the mill to flow out through drum 23 to the open end thereof. Alternatively, drum 23 may be larger in diameter than opening 22 in end plate 21. A splitter 24 having oblique members 26 thereon forming a trough on either side of the splitter is suspended or supported in any suitable manner so that an intermediate longitudinal section of the splitter is directly below the lip of drum 23. In Figure 1 splitter 24 is designed as shown in Figure 3 and is supported from center pipe 16 at a suitable distance below drum 23 by means of arm 27 from a collar 28 on pipe 16. Collar 28 has depending therefrom a flange 29 which is slotted as shown more clearly in Figure 2 so as to receive a threaded bolt 31 which extends through the eye 32 of arm 27 and through slot 33. A wing nut 34 on the end of bolt 31 provides ready means for adjusting and clamping splitter 24 in any suitable position on clamp 28. Collector hoppers 36 and 37 receive the split streams of pellets and deliver them to conveyors 38 and 39 respectively, for delivery to storage and to recycle. Recycle conveyor 39 connects with a chute 41 for delivery of recycle pellets to feed line or conveyor 42. In some mills, chute 41 delivers the recycle stream directly into the feed end of the mill at a point upstream of the delivery points of the flocculent black.

A suction line comprising a pipe 40 (shown in Figure 2 and in Figure 5) having a slot 45 along the drum side is positioned longitudinally within drum 23 adjacent the ascending wall thereof preferably adjacent the level of the finest material in the drum during rotation or classifying. Usually the suction line is advantageously placed about half way up the ascending side of the drum. This line is connected with a suction blower which withdraws extremely fine material and delivers it to the feed to the pelleting mill or to other suitable disposal.

Referring to Figure 2, similar elements of the mill are correspondingly numbered to those in Figure 1. Figure 2 shows slot 33 in flange 19 and one position of the splitter 24 relative to classifier 23. It also shows the adjustability of splitter 24 along the lower portion of the lip of drum 23 effected by loosening wing nut 34 and movement of the supporting bolt 31 in either direction along slot 33.

Clamp 28 is split and has a pair of flanges 41 each side of the split through which a bolt 42 passes for rigidly fixing the clamp on support pipe 16.

Figure 3 shows a splitter 24 having the design of splitter 24 in Figure 2 adapted for delivery of two streams of classified pellets or particles to the same end of the splitter at laterally spaced points. The splitter of Figure 3 is identical to that of Figure 1 except for the arrangement of one of the elements 26 for delivery of one of the streams to the opposite end of the splitter.

Figure 4 shows the delivery end of a pelleting mill 11 having a classifier drum 23 attached to the end plate 21 radially outside of the center opening 22 of the end plate. In this type of end plate a series of adjustable openings 43 are provided in the end plate intermediate opening 22 and classifier drum 23. In operation, this type of end plate delivers the pellets over adjustable weirs 50 in openings 43 and the pellets are caught by drum 23 for classification and delivery over the lip of the drum. Figure 4 shows an embodiment of the invention in which two splitters 44 are arranged on a radially extending arm 46 attached to center pipe 16 so as to divide the curtain of material falling over the lip of drum 23 into 3 separate streams which are received by collectors 47, 48, and 49. Splitters 44 extend radially outwardly from a slot 51 in arcuate section 52 of arm 46, and each has a splitter arm extending upstream of the flowing material so as to split the curtain of material gravitating over the lip of drum 23. Splitters 44 are adjustably attached to arcuate section 52 in a manner similar to that by which splitter 24 is attached to flange 29 of clamp 28 in Figures 1 and 2.

The stream of pellets collected in receiver 47 is passed through chute 53 to a recycle conveyor 54 for delivery to the feed end of the pelleting mill. An intermediate stream of intermediate size distribution collected in receiver 48 passes through chute 56 to conveyor 57 for delivery to product storage. A stream of particles or pellets of the largest size classification flowing from the mill and classifier is collected in receiver 49 and passes through chute 58 to conveyor 59 for delivery to a pulverizer or any suitable disposal or storage desired. Usually the pulverized material is returned or recycled to the feed end of the mill.

Figure 5 shows a cylinder or drum classifier which is adapted to be operated independently of a pelleting device or which may receive pellets from a pelleting mill for classification of the pelleted material received into two or more streams of different size distribution. The apparatus comprises a drum 61 having affixed thereto a plurality of tracks 62 and supporting wheel assemblies 63 on either side of a vertical plane passing through the axis of the classifier so as to support the classifier in a manner similar to that utilized in supporting the mill of Figures 1 and 2. The classifier drum 61 is rotated at a suitable speed by means of a motor 64 operated on the drive shaft and axle 66 of at least one of the wheel assemblies. If desired, one wheel of the wheel assembly may comprise a drive wheel having teeth which mesh with teeth on one of the tracks attached to the drum.

Material is fed to classifier 61 from a hopper 67 through a chute 68 which passes through end plate 69 of the classifier. A splitter 24 similar to that of Figures 1 and 2 is positioned below the lip of drum 61 in such a position as to separate the curtain of gravitating material into separate streams of a different range of particle size. Splitter 24 is supported in any suitable manner by a bracket 71. Collectors 72 and 73 receive the classified streams of particulate material and pass the same to conveyors 74 and 76, respectively, for delivery to storage or other suitable disposal. Obviously where desired, a plurality of splitters, such as those shown in Figure 4, may be utilized in combination with classifier 61 of Figure 5 so as to classify any given material of a fairly wide range of particle size into three or more separate streams. The suction line 40 is also shown in the classifier of this figure.

In operation of the apparatus shown in Figure 1 in the pelleting of carbon black, a suitable carbon black stream in flocculent form is passed into the feed end of the mill by a suitable conveyor 42. The black, together with recycle pellets from line 41, is delivered through openings 17 in center pipe 16 to the bed of black and pellets in the mill. Rotation of the mill forms pellets in conventional manner well known in the art as the mill is rotated and as the carbon black moves toward the opening 22 in the delivery end of the mill. The pellets so formed are of a wide range of sizes and as they pass through classifier drum 23 they are delivered over the ascending lip of the drum at elevations approximately inversely proportional to the size of the pellet, i.e., the largest pellets from the lowermost portion of the lip, the smallest pellets from the highest section along the ascending lip to which the pellets are carried by rotation of the drum, and intermediate sized pellets from intermediate sections of the lip. Splitter 24 is so positioned as to split the gravitating curtain of pellets at such a point as to obtain the desired size classification and/or separation. The two different streams of pellets thus separated are caught on opposite sides of the triangular prism of splitter 24 and are directed by the troughs formed by the prism surfaces and elements 26 into separate collectors 37 and 38. A stream of smaller pellets is passed to recycle conveyor 39 for delivery to line 42 and reintroduction into the feed end of the mill. The larger pellets collected by receiver 36 are delivered to product conveyor 38 which conveys the product pellets to packaging, storage, or such disposal as desired. In the process just described a different classification and utilization of the pellet stream emanating from the lip of the classifier may be made. By use of a pair of splitters in an arrangement such as that shown in Figure 4 the pellet stream is divided into a coarse stream, which includes oversize pellets and irregular shaped particles of carbon black in the form of scale from the sides of the mill, which is collected at the lowermost point of the lip and passed by conveyor to a pulverizer for comminution into powdered carbon black and reintroduction of the same into the feed end of a pelleting mill. An intermediate stream of intermediate size classification is recovered from the lip of the classifier between the splitters and is passed to product storage or packaging. A stream of finer pellets collected from the uppermost section of the curtain of pellets gravitating over the lip is deflected by the splitter into a separate hopper or receiver which delivers the same to the recycle conveyor to the front of the mill.

The operation of the classifier of Figure 5 is the same as that described for the classifier attached to the end of the pellet mill. Particulate material from any source is fed into the partially closed end of the mill through chute 68 and, as it passes through the rotating mill and gravitates over the lip of the open end, the curtain of gravitating particulate material is separated into a plurality of streams of desired size classification in the manner described for the operation of the splitters of Figures 1 and 4.

The diameter of the classifier drum affixed to a pellet mill will vary somewhat in accordance with the speed of rotation of the mill, but the diameter of the classifier is not critical. The most efficient classifier diameter and length for a given material may be readily determined by simple experiment and is within the skill of the art once it is known that small particulate fluent solid material can be classified by the technique and in the manner disclosed herein.

In carbon black pelleting it has been found feasible to remove approximately 85 percent of the +10 mesh and 50 percent of the −100 mesh pellets from the effluent stream from the mill. This results in a center cut which is more than 90 percent −18 to +100 mesh. A classifier was constructed of 30″ diameter pipe 30″ long. The drum was revolved at about 15 r.p.m. and was fed at a rate of approximately 9 pounds of carbon black pellets per minute. A spliter was set to reject 19 percent of the feed from the lowermost portion of the gravitating curtain of material passing from the lip of the drum. This 19 percent rejected included approximately 85 percent of the +10 mesh size pellets and 67 percent of the +18 mesh. A second splitter set to reject approximately 2 percent of the material from the uppermost part of the curtain of material gravitating over the lip of the drum removed about 50 percent of the −100 mesh material in the feed.

Typical results of screen analysis on feed, rejects, and product are recorded in the following table.

Table

| Screen size, mesh | U.S. Standard Screen | | | | | | |
|---|---|---|---|---|---|---|---|
|  | +10 | +18 | +35 | +60 | +100 | +120 | −120 |
| Feed | 2.0 | 6.5 | 69.3 | 92.0 | 96.5 | 97.2 | 2.8 |
| Bottom | 8.6 | 12.2 | 75.4 | 96.5 | 99.6 | 99.9 | 0.1 |
| Top | 0.2 | 1.7 | 30.2 | 78.9 | 96.4 | 96.9 | 3.1 |

The above described results clearly show the feasibility of classifying a particulate material having a range of particle sizes. It is, of course, to be understood that the position of the splitters can be adjusted to reject smaller and larger cuts of the extreme sizes in accordance with the size range of the desired center cut and the tolerance of fine and/or coarse particles in the center cut. This type of classifier is advantageous in classifying carbon black pellets from a conventional carbon black pelleting plant before shipment of pellets. In this manner most of the fines as well as oversized pellets which are present in the product can be readily removed. A classifier of the character described can be utilized in place of a rotary or other type screen which is frequently utilized to remove oversized pellets before shipment.

In the application of the pellet classifier of the invention in carbon black pelleting where the carbon black feed from the pelleting mill is fed into the classifier, an advantageous method of operation is to adjust one of the splitters so as to remove a small portion in the range of about 1 percent to 5 percent of the effluent pellets at the lowermost section of the lip of the classifier thereby removing pellets of about 10 mesh and coarser together with any scale or irregular particles which may be present. A second splitter is adjusted so as to separate from about 35 to 55 weight percent of the feed as fines for recycle to the front end of the mill as small pellet nuclei for the pelleting process. This arrangement leaves a center cut in the range of about 40 to 64 percent of the effluent from the mill as a product stream. It is desirable to limit the product pellets to a size range of about −18 to +60 mesh and by adjusting the splitters on any given classifier which is being fed from a pelleting mill the product pellets can be maintained pretty closely within this range. Usually, the coarser pellets are transferred to a suitable crusher or pulverizer for reduction in size and returning to the feed end of a pelleting mill.

Certain modifications of the invention will become apparent to those skilled in the art and the illustrative details disclosed are not to be construed as imposing unnecessary limitations on the invention.

I claim:

1. Apparatus for classifying generally spherical solid particles comprising in combination a cylindrical rotatable substantially horizontal drum unobstructed by flow control means; a closure plate on one end of said drum having axial inlet means therein for feeding particles thereto, the opposite end of said drum being completely open so as to permit particles to gravitate directly over the lip of said drum, whereby particles fed into said inlet build up a head and said particles are caused to move toward said lip solely by said head and the rotation of said drum; and at least one fixed splitter disposed vertically below said lip so that the particles passing over said lip gravitate directly to said splitter and are divided into a plurality of separate streams thereby.

2. The apparatus of claim 1 including a pair of fixed splitters spaced apart circumferentially with respect to said drum adapted to divide the effluent particles into three separate streams.

3. The apparatus of claim 1 in combination with a pellet mill wherein said inlet means is in communication with the delivery end of said mill to receive pellets therefrom.

4. The apparatus of claim 3 wherein the inlet end of the drum is attached directly to the delivery end of said mill in coaxial arrangement therewith.

5. The apparatus of claim 1 in which said at least one splitter is adjustable along said lip.

6. The apparatus of claim 1 including means for evacuating dust from said drum comprising a suction line positioned longitudinally within said drum adjacent an intermediate section of the ascending side of said drum when same is in rotation and generally parallel with the axes of said drum.

7. Apparatus for classifying generally spherical solid particles comprising in combination a horizontal disposed rotatable cylindrical drum unobstructed by flow control means, having an inlet for solid particles in a partially closed end adapted to maintain a head of pellets therein and an open other end, whereby particles fed into said inlet build up a head and said particles are caused to move toward said open end solely by said head and the rotation of said drum; a splitter positioned vertically below the lip of said open end so that when particles are fed into said drum and the drum is rotated, relatively large particles gravitate over the lowermost portion of said lip and fall on one side of said splitter, and smaller particles gravitate over an elevated portion of said lip on the ascending side of said drum and fall on the opposite side of said splitter, thereby dividing the effluent particles into two streams of different sized particles.

8. The apparatus of claim 7 including a second splitter disposed in spaced-apart relation circumferentially of said drum with respect to the first said splitter so as to separate the effluent particles into 3 separate streams of different sized particles.

9. In combination, a horizontally rotatable cylindrical carbon black pellet mill adapted to receive loose black in a partially closed inlet end and deliver small generally spherical pellets of different sizes from a partially closed delivery end thru outlet means positioned radially inwardly from the outside of said mill; a classifier attached directly to the delivery end of said mill with its shell radially outside of said outlet means comprising an elongated cylindrical shell unobstructed by flow control means, coaxial and rotatable with said mill, whereby pellets passing thru said outlet means into said shell build up a head therein and movement of pellets thru said shell is caused solely by said head and rotation of said shell, and said pellets gravitate over the lip of the shell at points spaced from the lowermost point of the lip distances along the ascending section of the shell in inverse proportion to the size of the pellets; at least one fixed splitter positioned vertically below the lower portion of said lip so as to divide the freely falling pellets into at least two streams of different sized pellets.

10. The apparatus of claim 9 including an axial pipe extending thru said mill and said shell; and support means suspended from said pipe having attached thereto said at least one splitter.

11. The apparatus of claim 10 in which said support means comprises a radial arm having a transverse arcuate lower section parallel with the end of said shell; an elongated slot in said arcuate section generally coaxial with said mill thru which adjustable fastening means extend and connect with a pair of splitters extending under the lip of said shell, thereby providing for lateral adjustment of said splitters along said slot.

12. A process for classifying generally spherical carbon black pellets of varying sizes admixed with fines comprising maintaining an elongated, substantially horizontal, tumbling bed of said pellets moving along an unobstructed horizontal path in a rotating drum, said pellets being free to move to an open end thereof; feeding pellets to said bed so as to maintain a greater depth of same upstream of said open end thereby creating a head of said pellets to cause same to move solely by the pressure of said head in a substantially horizontal direction to said open end during rotation of said drum, whereby pellets in said bed ascend the side of said drum distances approximately inversely proportional to their sizes as they pass to said open end; maintaining a suction zone adjacent the upper side of the finest carbon black on the ascending wall of said drum to collect fines; gravitating the pellets over the lip of said drum at their respective distances from the lowermost point of said lip; separating the resulting gravitating curtain of pellets into separate classified streams by partitioning said curtain radially of said drum; and separately collecting the pellets in the partitioned zones.

References Cited in the file of this patent

UNITED STATES PATENTS

| | | |
|---|---|---|
| 2,127,137 | Price | Aug. 16, 1938 |
| 2,642,343 | Studebaker | June 16, 1953 |
| 2,662,641 | Clark | Dec. 15, 1953 |